United States Patent [19]

Gluckin

[11] 4,172,002
[45] Oct. 23, 1979

[54] METHOD OF MAKING MOLDED BRASSIERE CUP

[76] Inventor: Gerald Gluckin, 440 E. 57th St., New York, N.Y. 10022

[21] Appl. No.: 870,448

[22] Filed: Jan. 18, 1978

[51] Int. Cl.² ............................ A41C 3/14; B29C 3/00
[52] U.S. Cl. ......................................... 156/245; 2/255; 128/463; 128/465; 128/477; 156/256; 156/264; 264/257; 264/258
[58] Field of Search ....................... 156/245, 256, 264; 2/255; 128/463, 465, 467, 476, 477, 479; 264/152, 153, 257, 258

[56] References Cited

U.S. PATENT DOCUMENTS

| | | | |
|---|---|---|---|
| 2,258,277 | 10/1941 | Bullinger | 128/477 |
| 2,462,295 | 2/1949 | Wittenberg | 128/477 |
| 3,021,845 | 2/1962 | Smith | 128/463 |
| 3,320,346 | 5/1967 | Galitzki et al. | 264/258 |
| 3,799,174 | 3/1974 | Howard | 156/245 |

Primary Examiner—Caleb Weston
Attorney, Agent, or Firm—Bauer & Amer

[57] ABSTRACT

A shape-supported molded brassiere cup in which a support patch manifesting a smooth surface bounding the volume of the three-dimensional cup shape is advantageously embodied in the brassiere cup construction during the molding thereof. Thus, the resulting cup obviates any need for shaping and stiffening stays or the like, and the surface of the support patch, being smooth because it expands in strict conformance with that of the moldable fabric ply, contributes to the comfort in the wearing and use of the brassiere.

5 Claims, 10 Drawing Figures

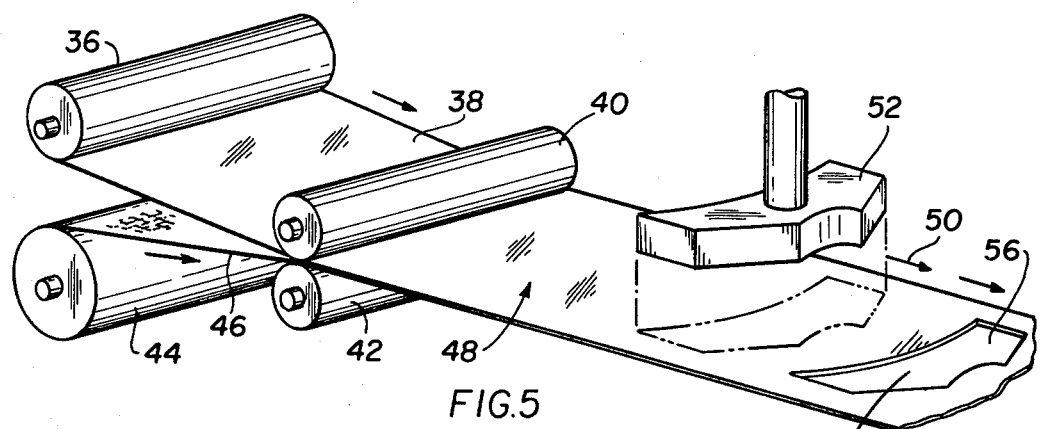
FIG.5
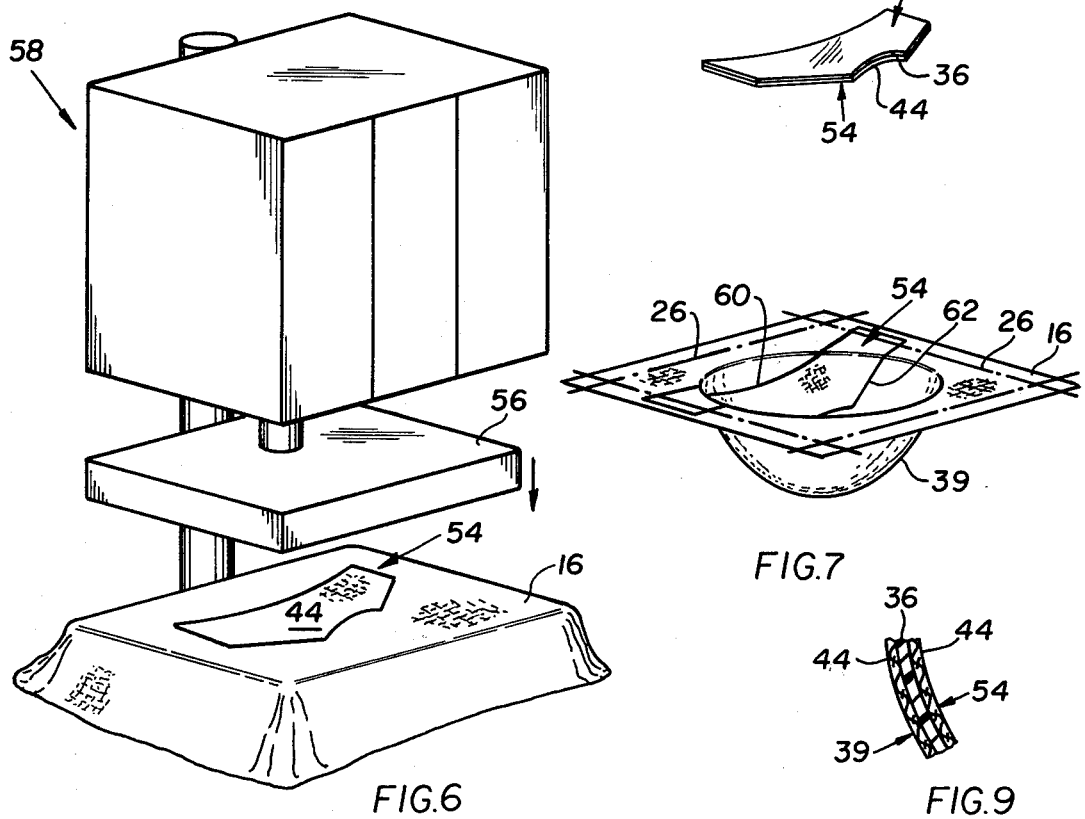
FIG.7
FIG.6
FIG.9
FIG.8
FIG.10

METHOD OF MAKING MOLDED BRASSIERE CUP

The present invention relates generally to improvements for a brassiere cup, and more particularly to an improved shape-supported molded brassiere cup that although embodying shape-supplementing or supporting structural features is nevertheless extremely comfortable to wear.

To provide stiffening and shaping to a brassiere cup resort is had to embodying wires, plastic stays, or the like in the construction of the cup, in any one of a variety of ways, all as is exemplified by the cup constructions of prior U.S. Pat. Nos. 3,196,460, 2,611,898, and 2,686,312, to mention but a few. The prior art wire or stay used is unavoidably pressed bodily into the user, and no matter how well cushioned, correspondingly unavoidably contributes to discomfort during wearing use of the brassiere.

Broadly, it is an object of the present invention to provide an improved shape-supported brassiere cup overcoming the foregoing and other shortcomings of the prior art. Specifically, it is an object to use to advantage the molding of a fabric ply into a three-dimensional cup shape by effectively causing the adhesion to said ply, during the molding thereof, of a shape-supporting patch in a selected, strategic location on the resulting cup, said patch having a smooth surface in bounding relation to the cup shape or volume, and thus not detracting in any way from the comfort in subsequently using the molded cup while nevertheless assisting in maintaining the three-dimensional shape thereof.

An improved shape-supported molded brassiere cup demonstrating objects and advantages of the present invention contemplates a fabric-molding method in which there is segregated from a supply source of moldable fabric utilized for said molded brassiere cup an operative portion thereof for use in contributing support to the ultimate molded shape of the brassiere cup. More particularly, said segregated fabric portion is laminated to a selected thermoplastic support material and a support patch is then die-cut out of the lamination. The patch and fabric ply, out of which the cup is to be molded, is then adhered together at a selected nominal low temperature to such extent that said adherence therebetween both fixes the position of said cup-supporting patch on the fabric ply and also contributes to the subsequent molding expansion of both in substantial conformance with each other. The molding of the cup is then carried out which also is effective in completing the adhering together of the cup-supporting patch to said fabric, this step being, of course, at a selected elevated temperature appropriate for the molding of said fabric. During the molding of the fabric into its three-dimensional cup shape, since the cup-supporting patch is adhered thereto at this time, there is also a shaping imparted to the patch which is substantially the same three-dimensional shape that is imparted to the fabric. Since both fabric and patch expand into the same, or a substantially conforming shape, any manifestation of wrinkles in the surface of the support patch, which would occur if different shapes were assumed, is effectively obviated.

The above brief description, as well as further objects, features and advantages of the present invention, will be more fully appreciated by reference to the following detailed description of presently preferred, but nonetheless illustrative embodiments in accordance with the present invention, when taken in conjunction with the accompanying drawings, wherein:

FIG. 1 is a front elevational view of said apparatus and FIGS. 2 and 3 are detailed front elevational views illustrating the operative positions of the molding elements which result in the production of a molded brassiere cup;

FIGS. 5 and 6 are perspective views illustrating the sequential steps according to the present invention of producing a shape-supported molded brassiere cup, again using the molding equipment of FIGS. 1-3, but with significantly enhanced product attributes over the product of FIG. 4;

FIG. 7 is a perspective view, similar to said prior art molded brassiere cup of FIG. 4, but of a first embodiment of an improved molded brassiere cup according to the present invention;

FIG. 8 is another perspective view of said first embodiment of the improved molded brassiere cup hereof showing further structural details thereof;

FIG. 9 is a partial sectional view, taken along line 9—9 of FIG. 8; and

FIG. 10 is a perspective view of a second embodiment of an improved molded brassiere cup according to the present invention.

It is already well known, as exemplified by U.S. Pat. No. 3,461,504 entitled "Fabric-Forming Apparatus" that fabrics having a plastic content, such as polyester or similar plastic yarns, can advantageously be shaped into three-dimensional configurations suitable for use as brassiere cups. It is a significant contribution of the present invention to extend the utility of the referred to brassiere cup molding equipment to produce a molded brassiere cup that is characterized by being effectively combined with additional material that effectively supports its three-dimensional configuration or shape. The adaptation of the brassiere molding equipment to achieve a shape-supported molded brassiere cup requires the proper preparation of the fabric, composed of the appropriate moldable material, so as to avoid wrinkles or other such unevenness as may occur between the material providing the support and the fabric which constitutes the molded brassiere cup, per se, all as will now be described in detail.

Figure 1:
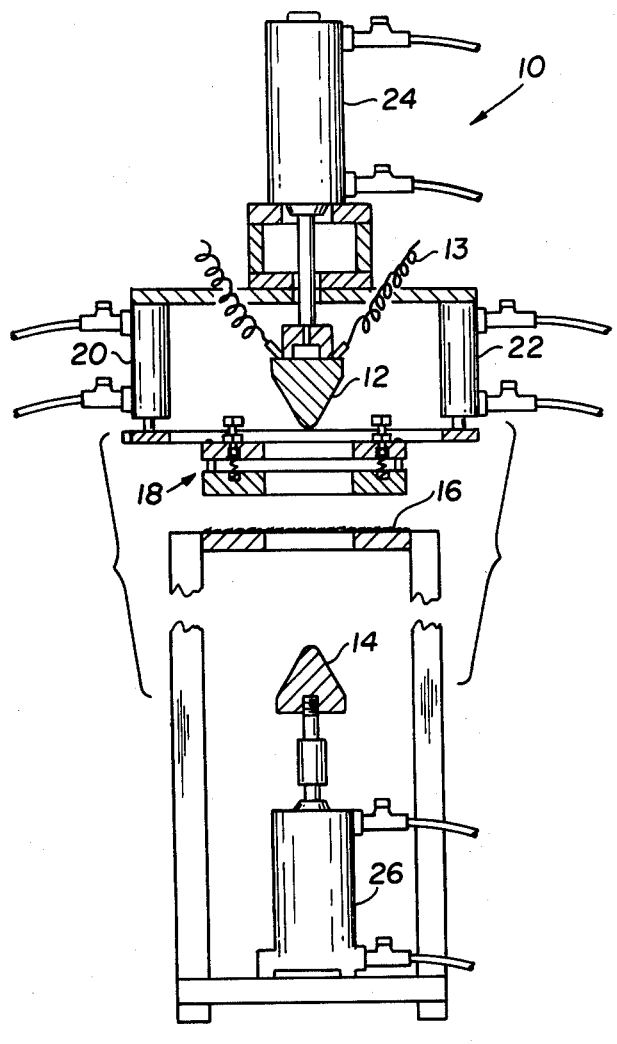
FIGS. 1-3 illustrate the mode of operation and construction of already known apparatus for producing a molded brassiere cup. Specifically.

Preliminary to such description, however, it is helpful to briefly review general aspects of fabric molding as related to the production of brassiere cups. As shown in FIG. 1, the molding equipment, generally designated 10, includes a "hot" molding element 12 or, in other words, an element which during molding service of the equipment 10 is raised to an elevated temperature using an electrical circuit 13. Cooperating with the "hot" element 12 is a "cold" element 14, which will be understood to be maintained at a temperature substantially below that of element 14 by being either water or air cooled, or cooled by some other appropriate means. Situated between the elements 12 and 14 is a rectangular piece or ply of fabric 16 having, as is well understood, sufficient plastic content so that it can be stretched from an initial flat condition into a three-dimensional cup shape, similar to the shapes of the molding elements 12 and 14.

Figure 2:
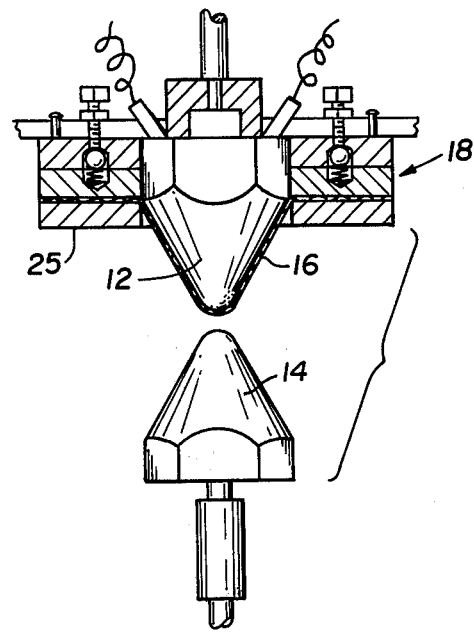
Figure 3:
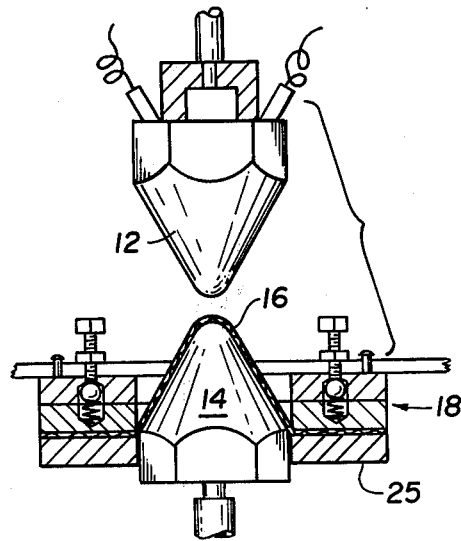

Located above the fabric ply 16 is a clamping frame 18 which is lowered by pressure air cylinders 20 and 22 against the peripheral edges of the fabric ply 16, a condition illustrated in FIGS. 2 and 3. This clamping of the fabric ply 16 is the first step in the molding procedure.

Next, and as may best be understood from FIG. 2, the "hot" element 12 is urged through a power stroke by operation of pressure cylinder 24 causing it to move through aligned openings in the frame 18 into contact with the fabric ply 16. Although ply 16 is engaged along its periphery between support table 25 and the clamp 18, the molding element 12 is of course effective in stretching the ply 16 in its unsupported central area. This of course converts the fabric ply 16 into a work-in-process molded brassiere cup.

As illustrated in FIG. 3, the molding process is completed by raising of the "hot" element 12 while operation of pressure air cylinder 26 simultaneously raises the "cold" molding element 14. As a result, the molded brassiere cup 16 is transferred from the "hot" element 12 to the "cold" element 14, the lower temperature of which effectively cures the fabric and stabilizes said fabric in its three-dimensional shape. The reversal in curvature of the fabric ply 16 during transfer from element 12 to element 14 has no adverse consequence. Following the transfer, clamp 18 is raised by appropriate operation of the cylinders 20 and 22, and the molded brassiere cup 16 is then readily removed from its position over the molding element 14.

With the above understanding of the molding technique as practiced by the molding equipment of FIGS. 1–3, supplemented by the detailed discussion thereof as set forth in U.S. Pat. No. 3,461,504, which by this reference is incorporated in its entirety herein, reference should now be had to FIG. 4 which illustrates the application of prior art techniques in the production of a shape-supported molded brassiere cup. More particularly, and as illustrated in this figure, there is no particular problem in confining the moldable fabric ply 16 about its four peripheral edges using the previously referred to holding frame 18, said confinement occurring along the reference lines individually and collectively designated 26. When held along the lines of contact 26 the movement of the molding member 12 in the central area of the ply 16 will result in the formation of the three-dimensional cup shape designated 28 in FIG. 4. What occurs, of course, is that the plastic yarns which make up the ply 16 in the area 28 are stretched from a flat configuration into a three-dimensional configuration which bounds the cup-shaped volume 28. During the stretching of the yarn in the area 28 it is important to note that the peripheral edges are confined against substantial movement along the lines 26. Thus, the stretching of the plastic yarns of the ply 16 against the resistance against movement exerted on the ply along the lines 26 is what produces the three-dimensional cup shape having a smooth inner surface 28.

Figure 4:
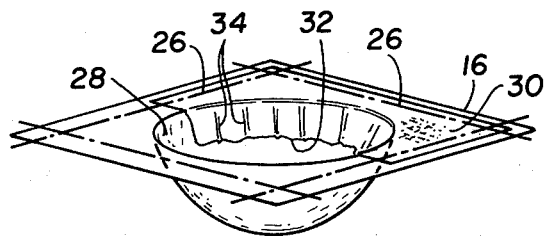
FIG. 4 is a perspective view of a molded brassiere cup, as produced by the molding equipment of FIGS. 1-3 and which, by applying prior art techniques, has its molded shape held in a three-dimensional configuration by support material applied to same.

The same result, namely, the smooth surface bounding any three-dimensional molded shape is, unfortunately, not possible to obtain using prior art techniques or, more particularly, the extension of prior art techniques illustrated in FIG. 4 insofar as attempting to embody a shape-supporting patch during the molding of said FIG. 4 brassiere cup 28 in the ply 16. Any such shape-supporting patch must of course be confined to the lower portion of the cup since this is the area in which the support is required. Thus, the placement of a support patch, such as that designated 30, in its proper and appropriate location of necessity results in only one long edge and two opposite side edges being confined against movement, while an opposite long edge 32 is totally unconfined since it is located in the central area 28 which is in the path of movement of the molding elements 12 and 14 and thus must be clear of all fabric-holding frames or clamps. Support patch 30 will of course be understood to be comprised of plastic yarn so that the heat generated by the molding element 12 is effective in softening the plastic so that it is readily forced into the interstices of the ply 16 and thus forms a physical attachment thereto. This physical attachment, however, is not sufficient to enable the support patch 30 to effectively function as means for maintaining the three-dimensional shape of the cup 28. The reason is that the patch 30, particularly along the unrestrained edge 32, during the molding of the cup 28 invariably forms wrinkles, as at the locations individually and collectively designated 34, mainly because the edge 32 is not substantially held against movement, as are the other three edges of the support patch 30. In other words during the molding process the edge 32 is not held taut, as are the other three edges, and it is therefore just as likely that the portion of patch 30 adjacent the edge 32 will contract and form wrinkles 34 as well as remain as a smooth surface, and this thus renders the outcome of the manufacturing procedure very unpredictable. Obviously any wrinkles 34 that form in the support patch 30 seriously detract from the utility of the molded brassiere cup 28 since they contribute to discomfort during use of the brassiere.

To overcome the foregoing and other shortcomings of the prior art, it is accordingly proposed that the ply 16 that is destined for use in the manufacture of a molded brassiere cup using the molding apparatus 10 of FIGS. 1–3 be prepared in a manner which will now be described in particular connection with FIGS. 5–7. This preparation is effective in producing a significantly improved molded brassiere cup that is characterized by the absence of any wrinkles in its support patch and is exemplified by the brassiere cup embodiments of FIGS. 8 and 10. This preparation contemplates a number of steps, the first of which is illustrated in FIG. 5. More particularly, the present invention contemplates the use of a polyester hot-melt adhesive supplied in film form that is available from any one of several sources, one such acceptable material being sold by General Fabric Fusing, Inc., of Cincinnati, Ohio. Said polyester, available in strip form, is put up in a supply roll 36 and a length portion 38 thereof is fed into and through a nip formed between two heating rollers 40 and 42. The portion of the moldable fabric destined for use as the supply patch, also put up in a supply roll 44, has a length portion 46 thereof that is also fed into and through the heating nip of the rollers 40 and 42. As a result, the fabric and plastic lengths 46 and 38 exit from the nip of the rollers 40 and 42 as a lamination, designated 48, i.e. a physically joined together strip in which the softened plastic 38 has been forced into the interstices of the fabric 46 and following solidification forms a mechanical bond to the fabric 46.

Still referring to FIG. 5, it will be noted that the feed path 50 of the lamination 48 exiting from the lamination nip of the rollers 40 and 42 brings the lamination to a die-cutting station at which a cutting die 52 is appropriately actuated through a cutting stroke resulting in the die-cutting separation from the supply length of the lamination 48 of a selected shaped support patch 54. Support patch 54, which it will be understood is readily removed from the die-cut 56 produced in the lamination by the cutting die 52 consists, of course, of the fused together shaped moldable fabric 44 and the similarly shaped plastic or polyester ply 36.

Next, and as is clearly illustrated in FIG. 6, the support patch 54 is turned with the fabric 44 uppermost and therefore with the plastic 36 in facing relation to the fabric ply 16. Said ply 16 is the material out of which, as already noted, the apparatus 10 will produce a molded brassiere cup. Support patch 54, more particularly, is carefully located on the ply 16 so that in the three-dimensional cup shape molded out of the ply 16, patch 54 will be correspondingly located in the lower portion of the cup. After the location of the patch 54 on the ply 16, as illustrated in FIG. 6, the preparation of ply 16 contemplates the use of a heating platen 56 which is lowered into contact with the superposed arrangement of the patch 54 and ply 16. Any appropriate heating apparatus or heat-sealer, generally designated 58, may be used for this purpose, one such appropriate device being a device sold under the trademark "FUS-O-MATIC" by General Fabric Fusing, Inc. of Cincinnati, Ohio. Noting again that the plastic 36 is a polyester hot-melt adhesive, the fusing temperature thereof is typically in the range between 375 to 425 degrees F. It is proposed in accordance with the present invention that the operating temperature of the heat sealer 58 be maintained at approximately 50 degrees below the lower limit of the fusing range, and thus that it be approximately 325 degrees F. Operating at this temperature, it has been found in practice that an adherence or attachment between the patch 54 and ply 16 is achieved to an extent that both fixes the position of the patch 54 on the ply 16 and also contributes, as will now be described, to a subsequent molding expansion of both the patch 54 and ply 16 in substantial conformance with each other. It is primarily as a result of the latter that the support patch 54 located on the interior surface of the molded cup always exists as a smooth surface, thus significantly contributing to the comfort of the user in the wearing and using of the molded brassiere cup.

FIG. 7, to which reference should now be made, illustrates the final step in the molding procedure and the noteworthy product attributes of the resulting brassiere cup just noted. More particularly, fabric ply 16 will be understood to be placed in the apparatus 10 of FIGS. 1–3 such that the same is confined peripherally, as along the lines 26. Support patch 54, as already described, is heat sealed to the patch 16 and in practice is therefore adhered over its entire surface which is in contact with the ply 16 to said ply. In practice, it has been found that as a result patch 54 assumes the very same three-dimensional shape as is assumed in the molded cup portion 39 of ply 16 even though the opposite edges 60 and 62 of patch 54 are not physically confined against movement by clamping action that is applied along the lines 26 by the clamps or holding frame 60 of the apparatus 10.

For completeness sake, reference is now made to FIGS. 8, 9 and 10. The actual molded brassiere cup, designated 39, is removed from the ply 16 as illustrated in FIG. 8. Cup 39 is comprised of fabric 44 appropriately molded into a three-dimensional cup shape having on its interior surface, namely the surface which actually bounds the cup shape, the support patch 54 in the strategic location which will be understood to be along the lower portion of the cup as it is embodied in a brassiere. The visible surface of the patch 54 is that of the fabric portion 44 of the lamination, as illustrated in the sectional view of FIG. 9. Thus, the plastic portion 36 of the lamination is advantageously used to complete the physical attachment of the support patch 54 to the brassiere cup 39 during the molding procedure. As understood, during such molding procedure, the molding temperature is within the fusing range of the plastic, and thus the plastic softens and in said softened condition is forced into the interstices of the fabric during the molding operation of the "hot" molding element 12 of apparatus 10. When the molded cup is however transferred to the "cold" molding element 14, the plastic 36 is solidified in its condition projected through the interstices of the fabric 44, thus completing a physical bond thereto. Most important, because the patch 54 and the cup 39 stretch in substantial conformance with each other under the influence of the molding element 12, the inner surface of the patch 54 is invariably smooth and thus the molded shape 39 is readily usable for the purpose intended, namely as a cup in a brassiere.

The improved molded brassiere cup embodiment illustrated in FIG. 10 is substantially similar to that illustrated in FIG. 8 and to denote this therefore the same reference numerals are used for similar structural features. The significant difference is that the support patch 54 is not confined in size or positioning to the lower portion of the resulting molded brassiere cup 39, but rather is of a circular configuration and thus includes additional portions 64, 66 and 68. Patch 54 is thus of a configuration that is designed to provide support to the resulting brassiere cup 39 around its entire periphery. It will of course be understood that the circular support patch 54 is removed from a similar lamination 48 and applied using heat sealer 58 to the molding fabric ply 16 preparatory to the molding procedure. As a result, the circular support patch 54 also expands in a shape which conforms to that of the cup shape 39 so that the inner edge 62 of the patch 54 is devoid of any wrinkles or other surface unevenness which would seriously detract from the usefulness of the molded brassiere cup 39.

From the foregoing it should be readily appreciated that there has been described herein illustrative embodiments of molded brassiere cups which are characterized by having effectively embodied in their constructions patches 54 to supply shape-supplementing support to the cups. Among other significant advantages, the improved molded brassiere cup embodiments of FIGS. 8 and 10 hereof thus do not require wires or plastic stays or similar stiffening or shaping elements in order to provide proper support to the user and to contribute to providing a pleasing and desirable appearance in the brassiere embodying the within improved molded brassiere cups.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. An improved molded brassiere cup fabricated of an appropriate moldable fabric in a fabric-molding method comprising the steps of segregating from a supply source of moldable fabric utilized for said molded brassiere cup an operative portion thereof for use in contributing support to the ultimate molded shape of said brassiere cup, producing a lamination between said segregated operative fabric portion and a selected thermoplastic support material, die-cutting a cup-supporting patch out of said lamination, causing the adhering together at a selected nominal low temperature of said cup-supporting patch to said fabric utilized for said molded brassiere cup to such extent that said adherence therebetween both fixes said position of said cup-supporting patch on said fabric and contributes to the subsequent molding expansion of both in substantial conformance with each other, and simultaneously completing the adhering together of said cup-supporting patch to said fabric at a selected elevated temperature appropriate for the molding of said fabric and causing the molding of said fabric into a three-dimensional cup shape, whereby said cup-supporting patch adhered to said fabric during said three-dimensional shaping thereof is correspondingly imparted with a three-dimensional shape conforming to that of said fabric.

2. The improved molded brassiere cup produced by the molding method as defined in claim 1 wherein said cup-supporting patch is restrictively sized and shaped for positioning in covering relation only over the lower portion of said molded brassiere cup and said patch thereby presents an upper edge that delineates same that is oriented horizontally of said brassiere cup, and wherein said patch upper edge and the portion thereof adjacent thereto is adhered to said fabric incident to the molding thereof to thereby expand in corresponding conformance therewith, whereby unevenness due to a possible non-conforming shape assumed in said edge in relation to said fabric is obviated.

3. The improved molded brassiere cup produced by the molding method as defined in claim 1 wherein said cup-supporting patch is restrictively sized and shaped for positioning in covering relation only about the peripheral edge of said molded brassiere cup and said patch thereby presents an edge bounding a central opening therein that is located centrally of said brassiere cup, and wherein said patch central opening edge and the portion thereof adjacent thereto is adhered to said fabric incident to the molding thereof to thereby expand in corresponding conformance therewith, whereby unevenness due to a possible non-conforming shape assumed in said central opening edge in relation to said fabric is obviated.

4. The improved molded brassiere cup produced by the molding method as defined in claim 1 wherein said thermoplastic support material is polyester in the form of a comparatively thin gauge translucent film having a fusing temperature in the range between 375 to 425 degrees F.

5. The improved molded brassiere cup produced by the molding method as defined in claim 4 wherein said nominal low temperature selected for the adhesion of said cup-supporting patch to said fabric is not greater than 325 degrees F.

* * * * *